United States Patent [19]
Tonjes

[11] Patent Number: 5,244,330
[45] Date of Patent: Sep. 14, 1993

[54] BOTTLER LOADER AND METHOD
[75] Inventor: Douglas G. Tonjes, Orlando, Fla.
[73] Assignee: Custom Metal Designs, Inc., Winter Garden, Fla.
[21] Appl. No.: 751,503
[22] Filed: Aug. 29, 1991
[51] Int. Cl.$^5$ .............................................. B65G 1/10
[52] U.S. Cl. ..................... 414/331; 414/754; 414/417; 414/420; 414/773; 414/779; 414/267; 414/280; 198/432; 53/246; 53/446
[58] Field of Search ............... 414/417, 416, 421, 404, 414/331, 661, 280, 754, 773, 779, 403, 420, 728, 742, 267; 53/246, 247, 446, 248

[56] References Cited
U.S. PATENT DOCUMENTS

| | | | |
|---|---|---|---|
| 1,270,756 | 6/1918 | Holmberg | 414/404 |
| 1,700,944 | 2/1929 | Loew | 198/432 |
| 3,040,491 | 6/1962 | Viitanen . | |
| 3,075,652 | 1/1963 | McCoy | 414/417 X |
| 3,160,295 | 12/1964 | Roark . | |
| 3,388,527 | 6/1968 | Vadas . | |
| 3,446,369 | 5/1969 | May et al. . | |
| 4,534,153 | 8/1985 | Nowicki . | |
| 4,555,215 | 11/1985 | Raasch et al. . | |
| 4,575,301 | 3/1986 | Lodi et al. | 414/420 X |
| 4,621,969 | 11/1986 | Berghall et al. . | |
| 4,634,333 | 1/1987 | Butterly, Jr. et al. . | |
| 4,911,602 | 3/1990 | Abe | 414/417 X |
| 4,929,140 | 5/1990 | Baker . | |
| 5,074,103 | 12/1991 | McDowell . | |

FOREIGN PATENT DOCUMENTS

| | | | |
|---|---|---|---|
| 452263 | 11/1927 | Fed. Rep. of Germany | 414/742 |
| 0222902 | 9/1987 | Japan . | |
| 0785187 | 12/1980 | U.S.S.R. . | |

Primary Examiner—Frank E. Werner

[57] ABSTRACT

A bottle loader and method for loading bottles onto shelves on a rack. The bottle loader has a carrier car rotatably supported on a frame. The bottles are placed in a vertical position and urged onto the carrier car. The bottles are then rotated on the carrier car from the vertical position to a horizontal position while horizontally aligning the bottles with the shelf on the rack. Once the bottles are aligned, they are urged off of the carrier car and onto the rack.

12 Claims, 6 Drawing Sheets

BOTTLER LOADER AND METHOD

BACKGROUND OF THE INVENTION

This invention relates to a method and apparatus for loading bottles. More specifically, this application relates to an apparatus for loading bottles from a vertical orientation to a horizontal orientation off of a conveyor and onto a shelf on a rack.

Water is typically fed into a large bottle while vertically oriented. A cap is then placed on the bottle's top and the bottle is fed onto a conveyor. A bottle loader then picks up the bottle and transports it to a shelf on a rack.

The bottles' orientation is typically changed from vertical to horizontal using a turner. The turner tips the bottle onto its side. The bottle is then rolled on a track into position adjacent a rack. Alternately the bottle is rolled onto an elevation which positions the bottle adjacent the racks. Once the bottle is in position it is pushed or lifted onto the rack.

A drawback of some of the prior art techniques is that as the rate at which the bottle is to be loaded on the conveyor increases, the bottles become clogged on the conveyor. Further, the bottles tend to vibrate when rolled as the bottle's speed is not controlled. Consequently, the bottles may tumble and jump the track. If the bottles jump the track they may jam the loader and halt the loading process.

Many loaders use elevators that lift the bottles to align the bottle with the shelf racks. Elevators have many moving mechanical parts and prove to be unreliable. Further, when the elevator's speed is increased the elevator may not lift all of the bottles. Thus, the speed of the elevator limits the throughput rate at which the bottles are loaded.

SUMMARY OF THE INVENTION

An object of this invention is to provide an improved method and apparatus for loading bottles.

Another object of this invention is to load bottles from a vertical orientation to a horizontal orientation with greater efficiency and reliability.

It is also an object of this invention to provide a method for efficiently moving bottles in a vertical position off of a conveyor and onto a rack in a horizontal position.

An additional object of this invention is to load bottles onto a rack with a device with moving parts that may quickly and easily be replaced when worn out.

A further object of this invention is to move bottles from a conveyor to a rack while at all times maintaining control of the bottles to prevent jamming.

These and other objects are provided with a method for loading a plurality of bottles, each of the bottles having an axis extending bodily from a bottle top through which liquid is fed into the bottle to a bottom of the bottle. The method comprises the steps of first horizontally moving the bottles onto a loader assembly while the axis of the bottles remains in a vertical orientation with the top of the bottles facing upwards. The axis of the bottle is then rotated from the vertical orientation to a horizontal orientation while aligning the bottles with vertically stacked shelves on a rack. The bottles are then moved off the loader assembly and onto the vertically stacked rack. Thus by the aligning the bottles as they are being rotated, bottles may be more easily and quickly moved onto the storage rack.

In a preferred embodiment of the invention, an apparatus is provided for loading bottles onto a rack. The apparatus includes a loader assembly having a frame and a carrier car with a plurality of compartments. Each compartment being adapted to receive a vertically oriented bottle. A shaft means connects the carrier car to the frame for permitting the carrier car to rotate on the frame from a first orientation where the bottle in the compartments are vertically oriented to a second orientation where the bottles in the compartments are horizontally oriented. The apparatus also includes means for rotating the carrier car from the first orientation to the second orientation and means for sliding the horizontally oriented bottle off of the carrier car and onto the rack after the carrier car is rotated to the second orientation. Thus, the bottles are quickly and efficiently moved from a conveyor where they are in a vertical orientation to a bottle rack where the bottles are in a horizontal orientation.

It may be preferable that each compartment have a floor that rotates with the carrier car to become a wall where the wall pivotally opens and aligns with the shelf on the rack. Further, it is preferable that the apparatus comprise means for pivotally opening the wall and for aligning the open wall with the shelf on the rack where the shelf compensates for varying heights of the shelves on a rack. Additionally, it is preferable that the apparatus further comprise an outwardly extending arm connected to the pivoting means. The latch means is releasably coupled to the arm securing the arm to the carrier car when the carrier car is in the first orientation and for releasing from the arm when the carrier car is rotated to the second orientation. This latch provides an added securing feature so that the floor of the carrier car does not weaken due to the weight of the bottles.

DESCRIPTION OF THE PREFERRED EMBODIMENTS

Figure 1:
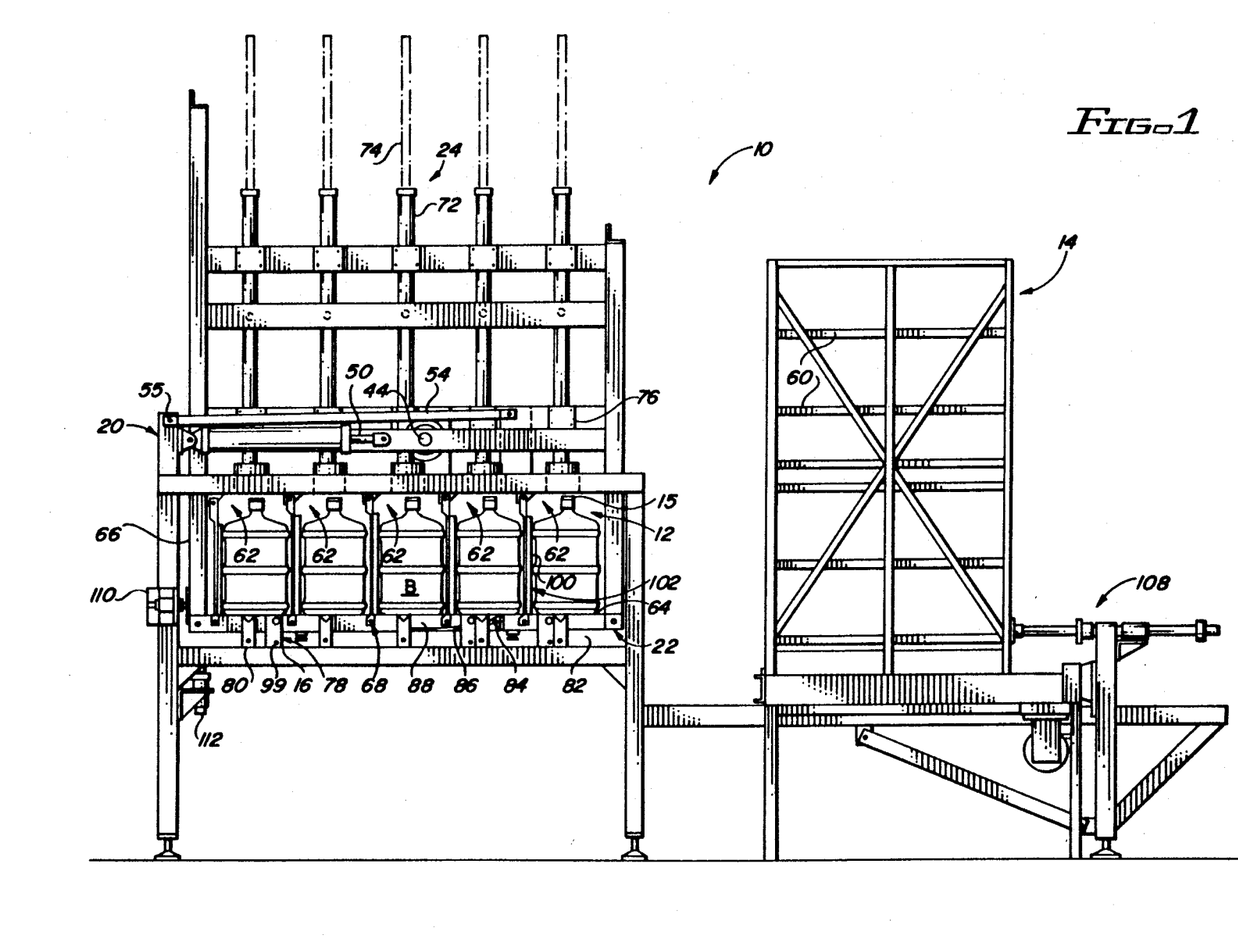
FIG. 1 is a side view of a loader assembly and a bottle rack with vertically oriented bottles located on the loader assembly, and a carrier car of the loader assembly in a first orientation.
Figure 2:
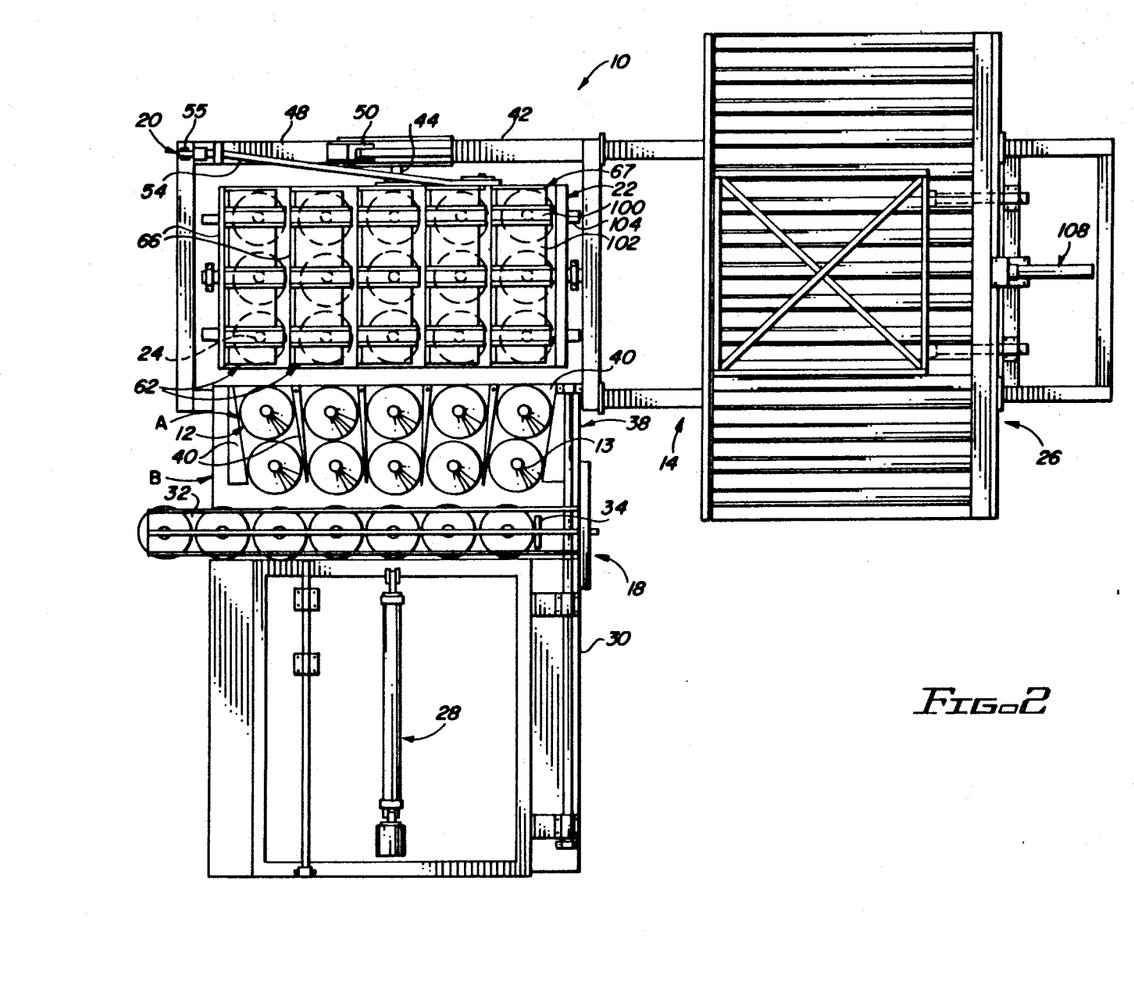
FIG. 2 is a top view of the bottle rack and a loader assembly shown in FIG. 1 with bottles being moved onto the loader assembly off of a conveyor assembly.
Figure 3:
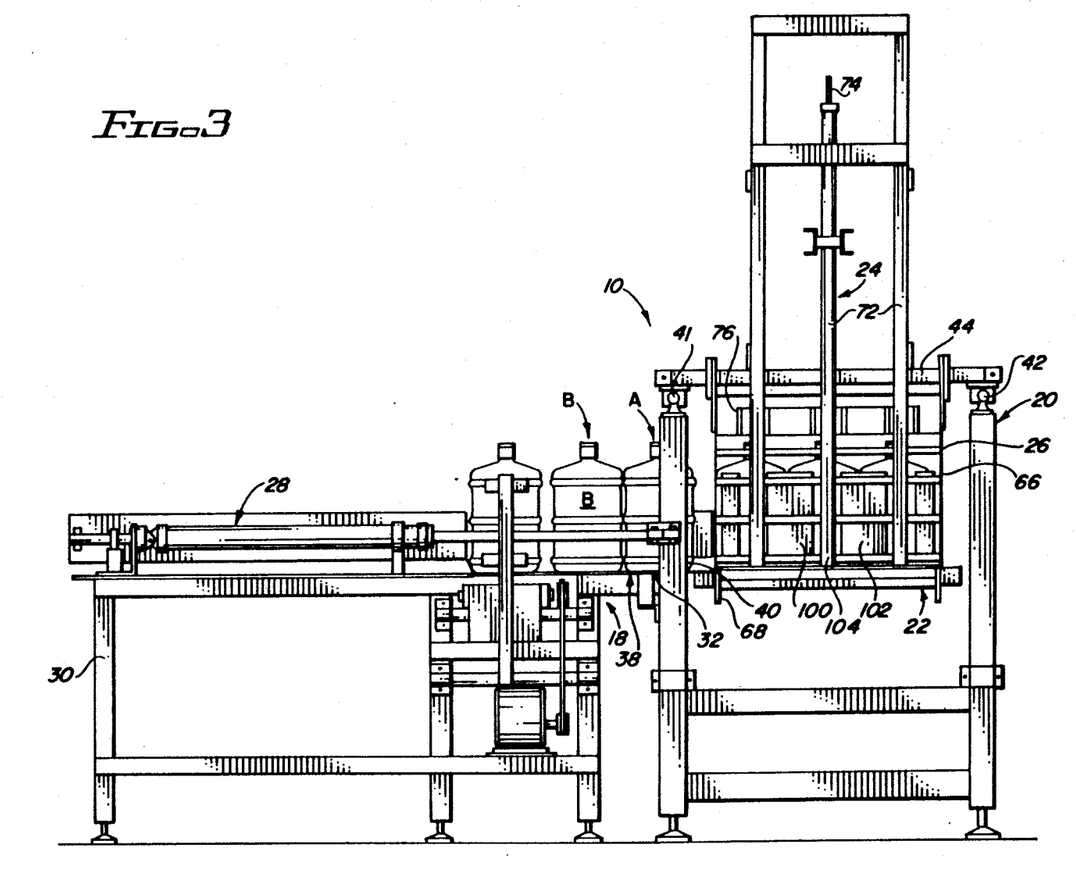
FIG. 3 is a front view of the conveyor assembly and loader assembly shown in FIG. 2.

Referring to FIGS. 1-3, there is shown a bottle loader assembly 10 onto which bottles 12 having an axis 13 in a vertical orientation are moved from a conveyor assembly 18. The bottles are then rotated (see FIG. 4) and moved onto a bottle rack 14 where the axis 13 of bottles 16 (see FIG. 5) are in a horizontal orientation. Referring to FIGS. 2-3, bottles 12 are moved into position in alignment within bottle loader assembly 10 with conveyor assembly 18 which then pushes the bottles into the bottle loader assembly 10.

Figure 4:
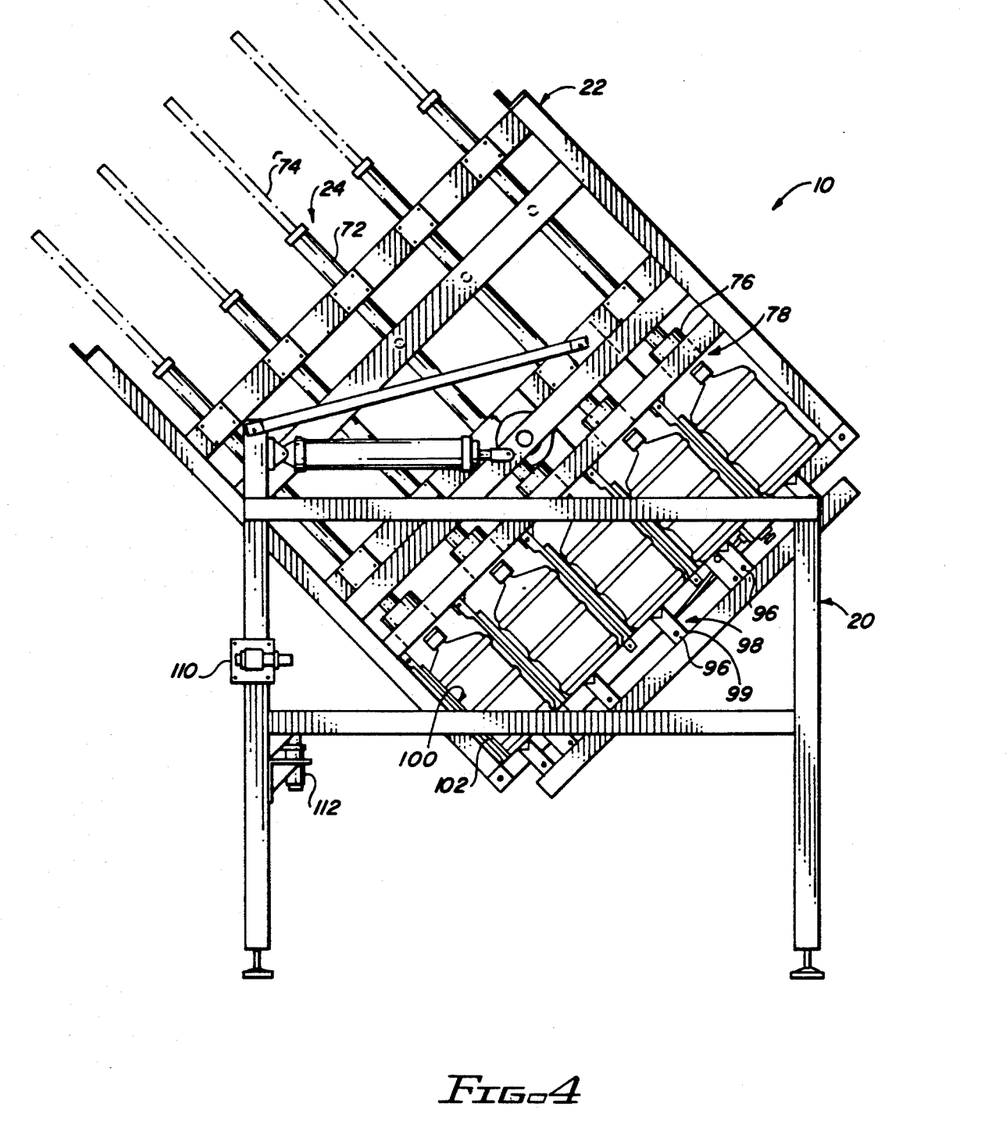
FIG. 4 is a side view of the loader assembly shown in FIGS. 1-3 with a carrier car on the loader assembly rotated 45°.
Figure 5:
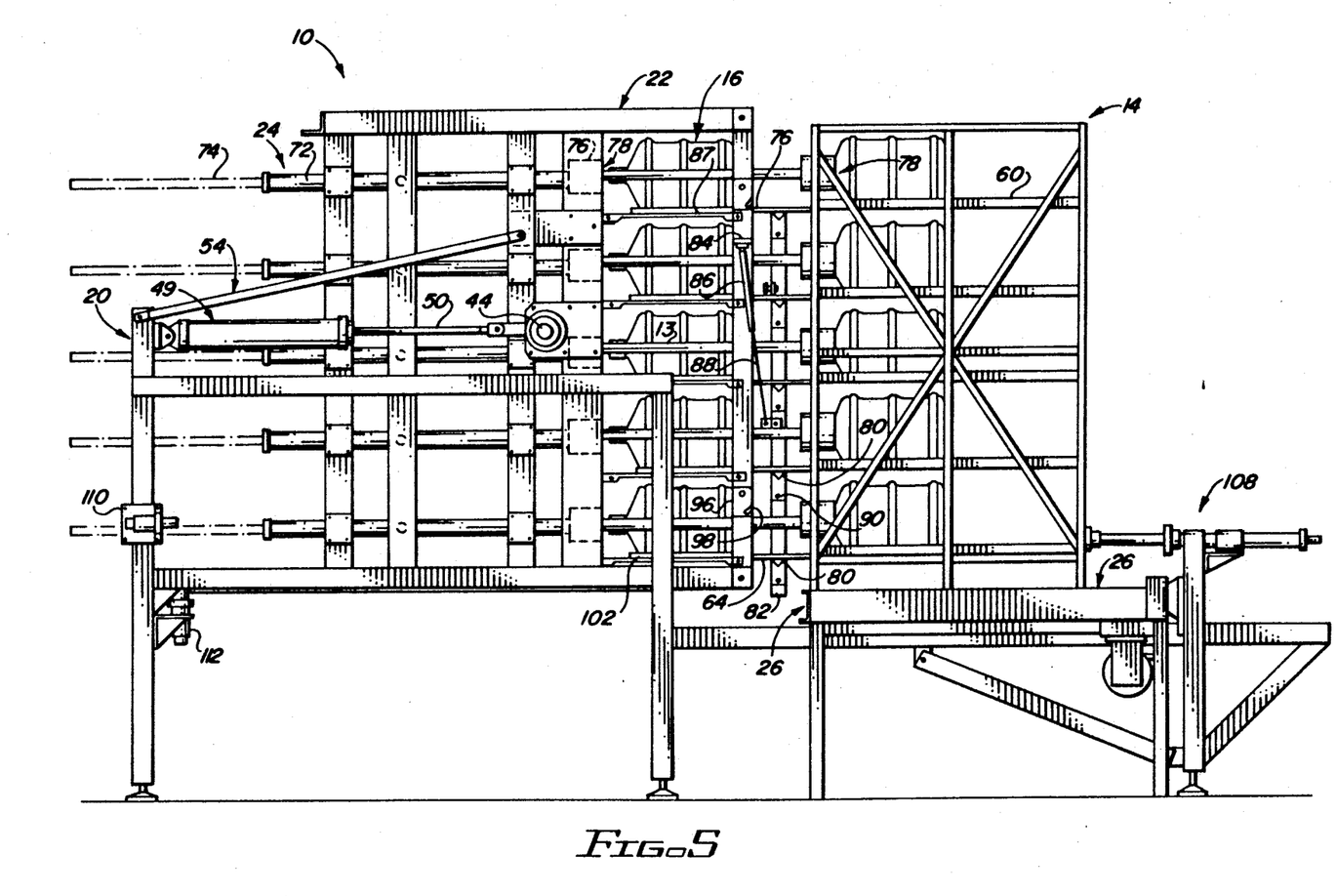
FIG. 5 is a side view of the loader assembly and bottle rack shown in FIG. 1, with horizontally oriented bottles positioned on the loader assembly and shown in phantom being loaded onto the rack and with the carrier car of the loader assembly in a second orientation.

Referring to FIGS. 1-5, bottle loader assembly 10 includes a frame 20 pivotally connected to carrier car 22 which rotates bottles from their vertical orientation to the horizontal orientation. Referring to FIG. 5, once carrier car 22 is rotated to the horizontal orientation, a ram assembly 24 on carrier car 22 urges bottles 16 onto bottle rack 14. Bottle rack conveyor assembly 26 then moves bottle rack 14 forward and then moves the next bottle rack 14 in its place aligned with bottle loader assembly 10. After bottles 16 have been unloaded, ram assembly 24 retracts and carrier car 22 rotates to the first orientation where more bottles are pushed onto carrier car 22.

Referring to FIGS. 2 and 3, conveyor assembly 18 includes an infeed pusher assembly 28 resting on table 30. A conveyor belt 32 is mounted on conveyor assembly 18 to transport vertically oriented bottles 12 into place adjacent bottle loader assembly 10. Bottles 12 are aligned with bottle loader assembly 10 on conveyor belt 32 using stop 34.

Infeed pusher assembly 28 urges bottles 12 onto a platform 38 between conveyor belt 32 and bottle loader assembly 10. Platform 38 includes a plurality of splitter guides 40 which space vertically oriented bottles 12 apart and align them so that they may be loaded onto assembly 10.

During operation the vertically oriented bottles 12 are first aligned with conveyor belt 32. Infeed pusher assembly 28 then urges bottles 12 into position designated by "B", and conveyor assembly 18 moves conveyor belt 32 forward to feed more bottles 12 adjacent infeed pusher assembly 28. Next, infeed pusher assembly 28 urges bottles 12 into the position designated by position "B" moving previous bottles to position "A". Conveyor belt 32 then moves more bottles 12 forward into position aligned with bottle loader assembly 10. Finally, infeed pusher assembly 28 pushes bottles on conveyor belt 32, the bottles 12 in position "A", and the bottles 12 in position "B" onto carrier car 22 of loader assembly 10. Vertically oriented bottles 12 continue to be urged into position "A" and "B" while carrier car 22 rotates to increase the bottle loader assembly's 10 loading rate.

Referring to FIGS. 1-3, extending horizontally on and coupled to the opposite sides of frame 20 are rods 41 and 42, respectively. Extending through carrier car 22 and resting on rods 41 and 42 is shaft 44. Shaft 44 is attached to carrier car 22 and slides on rods 41 and 42. A horizontally oriented carrier car cylinder 48 is coupled to frame 20 at one end and has a piston 50 which extends outward from carrier car cylinder 48 and is pivotally coupled to shaft 44. A corresponding cylinder and piston (not shown) are coupled to frame 20 and the other end of shaft 44 in a similar manner.

Also coupled to carrier car 22 at a predetermined distance away from shaft 44 is link arm 54. Link arm 54 is pivotally coupled with pivot rod 55 to carrier. 22. Shaft 44 slides forward and backward on rods 41 and 42 in response to piston 50 extending and retracting in carrier car cylinder 48. When shaft 44 moves forward link arm 54 pivots upward (see FIGS. 4 and 5) about rod 55 and carrier car 22 rotates counterclockwise (see FIG. 4) about shaft 44. While piston 50 continues to extend carrier car 22 rotates from 0° to 90° about shaft 44 until bottles 16 and axis 13 are horizontally oriented.

Carrier car 22 has a plurality of compartments 62 for holding bottles. Each compartment 62 preferably holds three bottles; however, compartment 62 and carrier car 22 may be expanded outward or contracted inward to hold more or less bottles. The quantity of bottles each compartment 62 holds is set depending on throughput required with loader assembly 10.

Each compartment 62 has a floor 64 and a wall 66. A bar assembly 68 extends along floor 64 and glides outward away from carrier car 22 to pivotally open floor 64. When the axis 13 of bottles 12 are vertically oriented and the loader assembly 10 is in first orientation, compartments are horizontally aligned and floor 64 is secured to compartment 62 with a bar assembly 68. As carrier car 22 is rotated to its second orientation, compartments 62 become vertically stacked with different vertical levels. Walls 66 of compartment 62 become aligned with shelves 60 and are rotated to a horizontal orientation. Bar assembly 68 glides outward to rotate floor 64 open in a horizontal orientation so that bottles 16 may be urged over the floor's surface onto rack 14.

Referring to FIGS. 4-5, coupled to carrier car 22 are a plurality of ram assemblies 24 each having a cylinder 72 and a piston 74. Connected to the end of piston 74 is head 76 that encloses a void 78. Head 76 receives top 15 of bottle 16 into void 78. Pistons 74 of ram assembly 24 are activated simultaneously or individually to horizontally move bottles 16 onto shelves 60 of rack 14. After urging the bottle onto the shelf 60 piston 74 retracts so that carrier car 22 may be rotated to its first orientation.

Referring to FIG. 5, bar 82 is hingedly coupled to floor 64 with couplings 80. Bar 82 is activated by a floor cylinder 86 and piston 88. Floor cylinder 86 is attached to carrier car 22 with pivot rod 84. Extending outward from floor 64 is rod 90 through a slot 92 in bar 82 is pivot rod 90. Bar 82 is moved outward when piston 88 extends to pivotally open floor 64 into a horizontal orientation. Slot 92 allows each of floors 64 to individually adjust to the level of shelves 60 of rack 14. Floor cylinder 86 and piston 88 open floor 64 when carrier car 22 is in its second orientation so that horizontally oriented bottles 16 may be unloaded by being urged onto shelves 60.

When bottles 16 have been unloaded, floor cylinder 86 retracts piston 88 to pivotally close floor 64. Carrier car 22 may be rotated clockwise back to its first orientation.

Also disposed along the bottom of side surface of carrier car 22 are gravity links 96. Links 96 are preferably pivotally connected to carrier car 22 and have a slot 98 that mates with an outwardly extending rod 99 on bar 82 when carrier car 22 is in the first orientation. However, as carrier car 22 rotates to its second orientation, gravity draws link 96 to pivot downward to release rod 99 allowing floor 64 to be pivoted by floor cylinder 86. However, when carrier car 22 is in its first orientation, slot 98 of link 96 receives rod 99 so that link 96 holds floor 64 closed when carrier car 22 is in its first orientation. Further, gravity link 96 prevents floor 64 from opening due to the weight of bottles 12 or loss of air pressure.

Disposed on surface of floor 64 are guard devices 100 and 102 being separated by a groove 104. Groove 104 and guard devices 100 and 102 provide a guide for bottles 16 when urged by ram assembly 24 onto shelf 60. Groove 104, as well as guard devices 100 and 102, are built to hold bottles in place when carrier car 22 is rotated.

Referring to FIG. 5, rack 14 has a plurality horizontally oriented of shelves 60 that are vertically stacked on top of each other. Shelves are positioned to align with bottles 16 in compartments 62 on carrier car 22 when rotated to the second orientation. An aligner assembly 108 is provided on bottle rack transfer conveyor assembly 26 to maintain bottle rack 14 in a preset position as bottles 16 are urged onto rack 14.

Sensors (not shown) are preferably provided on conveyor assembly 18, bottle rack transfer conveyor assembly 26, ram assemblies 24 and infeed pusher 36 to sense the position of bottles 12, 16 and the infeed pusher 36. These sensors are built and placed on conveyor assembly 18, loader assembly 10 and bottle rack transfer conveyor assembly 26 using known techniques.

Referring to FIGS. 1, 4 and 5, shock absorbers 110 and 112 are provided on frame 20 to reduce impacts when carrier car 22 is rotated from its second orientation back to its first orientation. Shock absorber 100 also provides a stop to maintain carrier car 22 in alignment when it is rotated to the first orientation.

Figure 6:
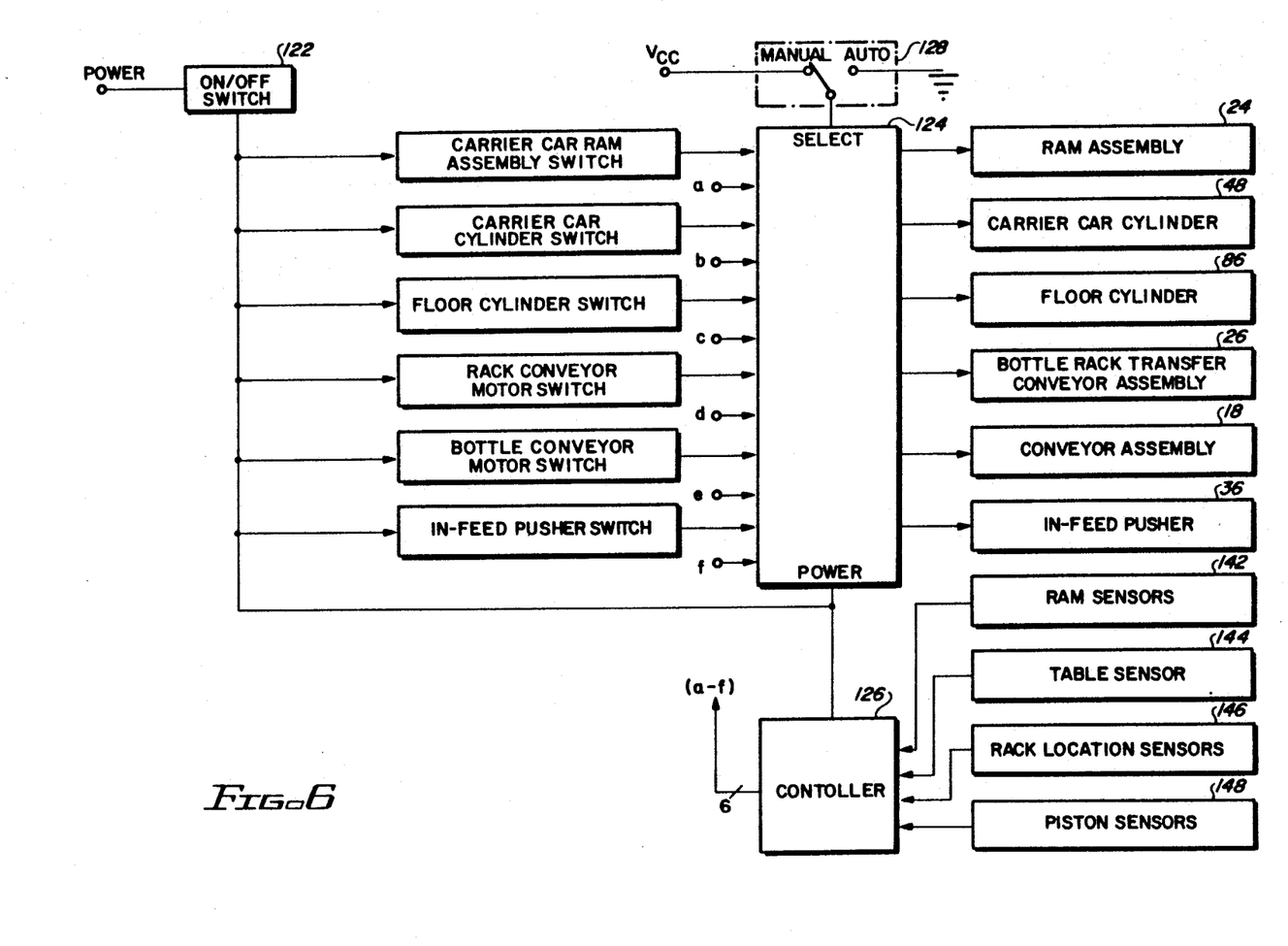
FIG. 6 is a block diagram of the electronics for operating the loader assembly.

Referring to FIG. 6, there is shown a block diagram of the electronic circuit 120 to control bottle loader assembly 10, infeed pusher 36, conveyor assembly 18 and bottle rack transfer conveyor assembly 26. Circuit 120 receives power through on/off switch 122 and is fed through a plurality of switches 130-140, a selector 124 and controller 126. Circuit 120 with switch 128 is used to determine whether various rams, conveyors, pushers and carrier car cylinders of bottle loader assembly 10 are to be operated manually or automatically. When switch 128 is set to manual these pistons and cylinders are activated manually, and when selected to auto, cylinders, pistons, rams, etc. are activated by controller 126.

The manual switches include the carrier car ram switch assembly 130, the carrier car cylinder switch 132, a floor cylinder switch 134, rack conveyor motor switch 136, bottle conveyor motor switch 138 and infeed pusher switch 140. These switches are coupled through selector 124 to a respective ram assembly 24, carrier car cylinder 48, floor cylinder 86, bottle rack transfer conveyor assembly 26, conveyor assembly 18 and infeed pusher 36.

Controller 126 is coupled to ram sensors 142, bottle sensors on the table sensor 144, rack location sensors 146 and piston sensors 148. Controller 126 notes the position of bottles 12 and 16. Controller 126 then feeds signals through selector 124 on channels "a" through "f" to a respective cylinder, motor, pusher or ram assembly to automatically control loader assembly 10, conveyor assembly 18 and bottle rack transfer conveyor assembly 26 operation.

Ram assemblies 24, infeed pusher 36, bottle rack transfer conveyor assembly 26 and floor cylinder 86 are preferably connected to a common pneumatic source. These systems are controller by electronic circuit 120 to electronically open and close air valves. Opening and closing these air valves enables the various mechanical functions of the bottle loader assembly 10.

This concludes the description of the preferred embodiments. A reading by those skilled in the art will bring to mind various changes without departing from the spirit and scope of the invention. It is intended, however, that the invention only be limited by the following appended claims.

What is claimed is:

1. An apparatus for loading bottles with an axis extending laterally therethrough onto a rack comprising:
    a loader assembly having a frame and a carrier car with a plurality of compartments, each compartment having a floor and being dimensioned to receive a bottle with the bottle axis being vertically oriented;
    means for loading bottles into the compartments;
    shaft means connecting said carrier car to the frame for permitting said carrier car to rotate on the frame from a first orientation where the axis of the bottles in the compartments are vertically oriented to a second orientation where the axis of the bottles in the compartments are horizontally oriented and with the floor of each compartment becoming a wall;
    means for rotating said carrier car from the first orientation to the second orientation;
    an outwardly extending arm and a latch means releasably coupled to said arm for securing said wall of each compartment to said carrier car when said carrier car is in the first orientation and for releasing from said arm when said carrier car is rotated to the second orientation;
    means for pivotally opening said wall of each compartment and for aligning said opened wall with a corresponding shelf on the rack; and
    means for sliding the horizontally oriented bottles off of the carrier car and onto the rack after the carrier car is rotated to the second orientation.

2. The apparatus for loading bottles as recited in claim 1 wherein said shaft means extends horizontally through said carrier car adjacent said carrier car's center of gravity.

3. The apparatus as recited in claim 1 further comprising a guard means disposed on said floor for guiding the horizontally oriented bottles when slid off of the rack.

4. The apparatus as recited in claim 1 further comprising a conveyor means for transporting vertically oriented bottles into a position where the bottles are aligned with the compartments, and means for pushing the bottles off of the conveyor means and into said compartments.

5. An apparatus for loading bottles with an axis extending laterally therethrough onto a rack comprising:
    a loader assembly having a frame and a carrier car with a plurality of compartments, each compartment being adapted to receive a bottle with the bottle axis being vertically oriented;
    means for loading bottles into the compartments;
    shaft means connecting said carrier car to the frame for permitting said carrier car to rotate on the frame from a first orientation where the axis of the bottles in the compartments are vertically oriented to a second orientation where the axis of the bottles in the compartments are horizontally oriented;
    means for rotating said carrier car from the first orientation to the second orientation, said rotation means including a carrier cylinder having an extending piston, said carrier cylinder being attached to said frame and said piston being attached to said shaft means; said rotating means further including a link arm attached to said frame at one end and attached to a first location on said carrier car at another end, said shaft means being a predetermined distance away from said first location such that when said piston extends to said first location, said carrier car rotates about said shaft means; and means for sliding the horizontally oriented bottles off of the carrier car and onto the rack after the carrier car is rotated to the second orientation.

6. The apparatus as recited in claim 5 further comprising a horizontally extending rod coupled to said frame, and wherein said shaft means is slidably coupled to said rod such that when said piston extends said shaft means slides along said rod to rotate said carrier car.

7. An apparatus for loading bottles from a conveyor onto shelves on a storage rack, the apparatus comprising:
- a loader assembly having a frame resting on a floor and a carrier car with a plurality of juxtaposed compartments, said compartments being horizontally aligned with each other and being adapted to receive a bottle in a vertical orientation;
- a conveyor means for aligning each of the vertically oriented bottles with one of said compartments;
- a first pusher simultaneously urging each of the aligned bottles off of the conveyor and into one of said compartments;
- a pair of parallel rods that are horizontally oriented and connected to said frame;
- a shaft slidably coupled between said rods and pivotally connected to said carrier car such that said carrier car is permitted to rotate about said shaft from a first orientation where bottles in said compartments are in a vertical orientation to a second orientation where bottles in said compartment are in a horizontal orientation and aligned with the storage rack;
- a horizontally oriented cylinder having outwardly extending piston coupled to said shaft, said cylinder being coupled to said frame;
- a link arm coupled at one end to said frame adjacent said cylinder connection to said frame, said link arm being connected to said carrier car a predetermined distance away from said shaft;
- said first piston operative to extend outward or retract inward such that when said piston extends outwardly said shaft slides in a first direction along said rods to rotate said carrier car to the second orientation and when said piston retracts inwardly said shaft slides in a second direction along said rods opposite to said first direction to rotate said carrier car into the first orientation; and
- a second plurality of pistons operative to simultaneously urge the horizontally oriented bottles out of the compartments and onto the rack when said carrier car is in the second orientation.

8. The apparatus for loading bottles as recited in claim 7 wherein said compartment has a floor that has a surface is in a horizontal orientation when said carrier car is in the first orientation, and wherein said floor's surface is in a vertical orientation when said carrier car is in the second orientation, said floor surface being operative from said vertical orientation to a horizontal orientation to align with the shelves on the storage rack so that bottles slide over the floor surface when the bottles are urged onto the rack.

9. The apparatus for loading bottles as recited in claim 8 further comprising a bar extending adjacent said compartments and hingedly coupled to a side of said floor on each of said compartments operative to pivotally open said floor when said bar is moved away from said compartments, said bar being operable to pivotally close said floor when said bar is moved toward said compartments.

10. The apparatus for loading bottles as recited in claim 9 further comprising:
- a horizontally oriented rod coupled to said bar; and
- a latch pivotally attached to said compartment and removably coupled to the rod, said latch being operative to hold said bar to said compartment to prevent said floor from opening when the carrier car is in the first orientation, and said latch being operative to pivot and release said bar from said compartment when the carrier car is rotated to the second orientation.

11. The apparatus for loading bottles as recited in claim 9 wherein said side of said floor includes a rod and said bar includes a slot, said rod extending through the slot to permit the floor to align with a shelf on the rack when said carrier car is in the second orientation.

12. The apparatus for loading bottles as recited in claim 8 further comprising a plurality of guards extending along the surface of said floor and forming a channel to guide the bottles onto the shelf when the horizontally oriented bottles are urged out of said compartments.

* * * * *